June 2, 1970   C. F. SPORMAN   3,515,432
VERTICALLY AND ROTATIONALLY ADJUSTABLE SEAT STRUCTURE
Filed May 14, 1968   2 Sheets-Sheet 1
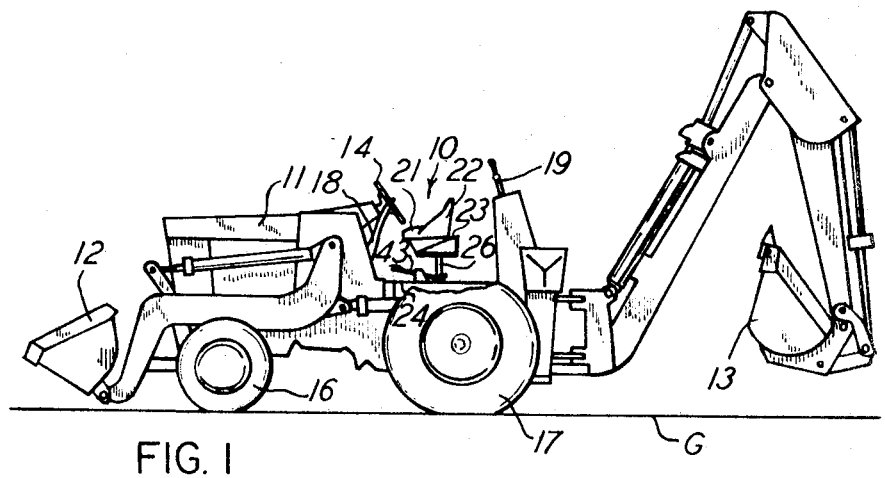
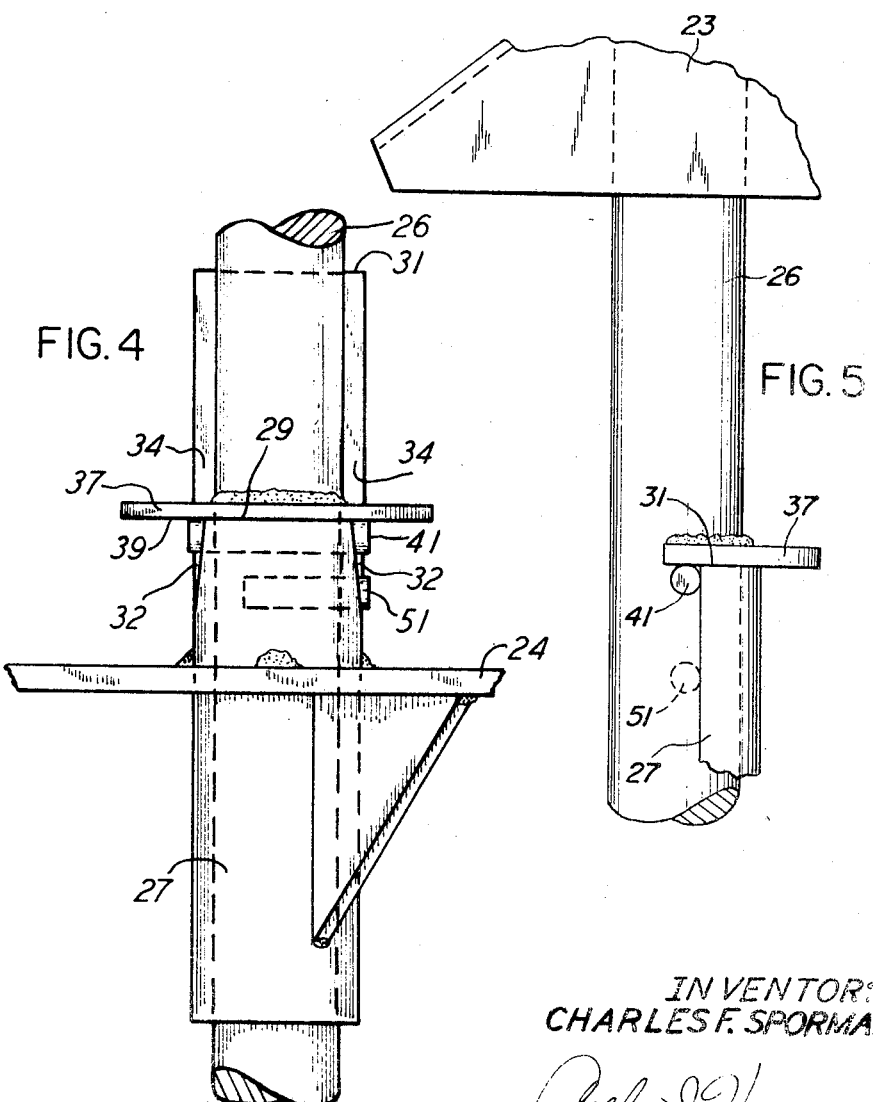
INVENTOR:
CHARLES F. SPORMAN
Arthur J. Hansmann
ATTORNEY

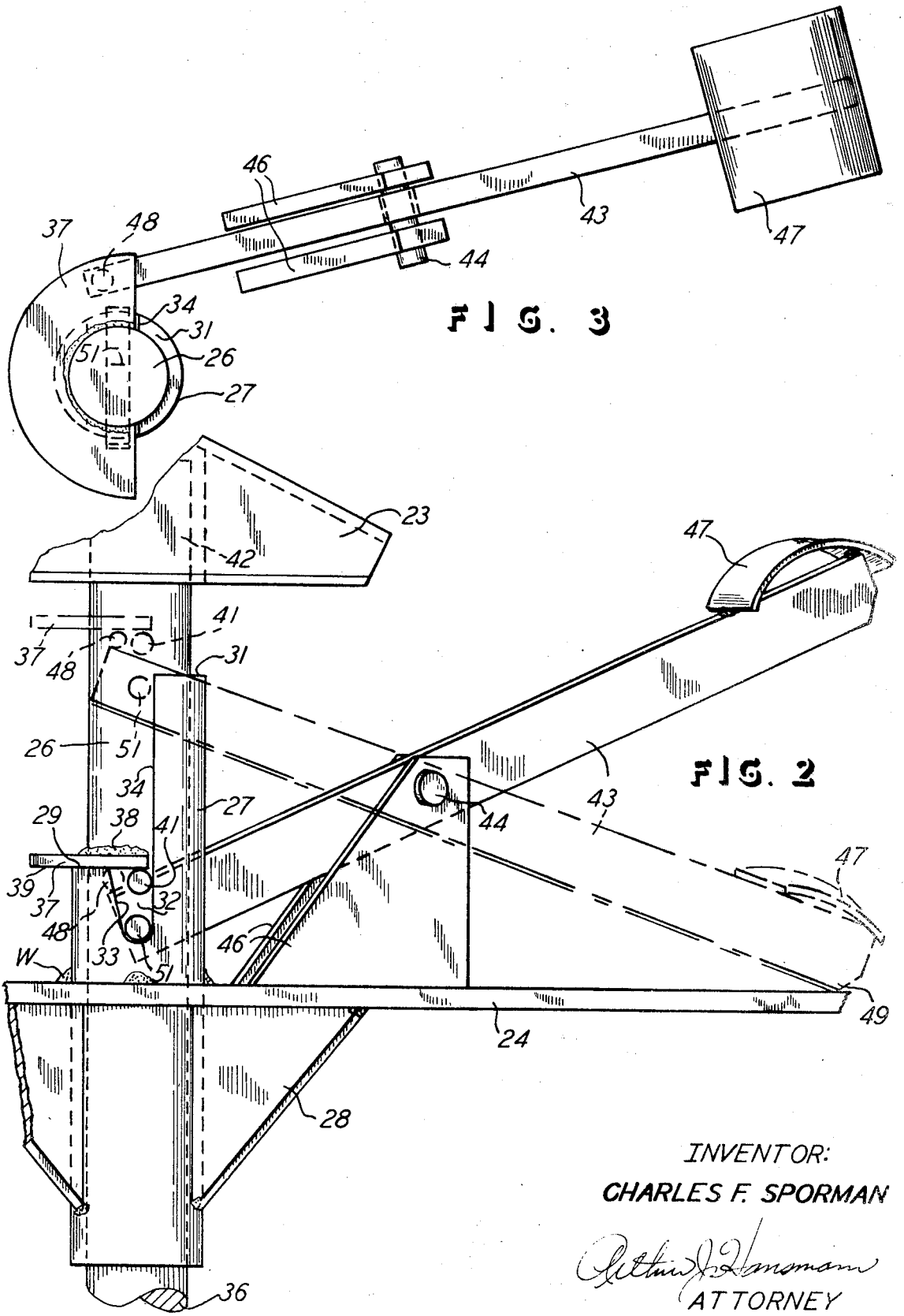

United States Patent Office 3,515,432
Patented June 2, 1970

3,515,432
VERTICALLY AND ROTATIONALLY ADJUSTABLE SEAT STRUCTURE
Charles F. Sporman, Peoria, Ill.
Filed May 14, 1968, Ser. No. 732,487
(Filed under Rule (47)b and 35 U.S.C. 118)
Int. Cl. B60n 1/02
U.S. Cl. 297—347                    5 Claims

ABSTRACT OF THE DISCLOSURE

A vertically and rotationally adjustable seat structure including a pedestal and a seat assembly movable with respect to the pedestal so that the seat can be both raised and rotated. Lift means are provided for raising the seat structure, and securing or locking means are engageable between the seat assembly and the pedestal for retaining the seat assembly in either an upper or a lower position, and also in the rotated positions, facing both forward and backward.

BACKGROUND OF THE INVENTION

This invention relates to a vertically and rotationally adjustable seat structure. It has particular application where it is desired to have a seat for supporting a person in either a lowered or raised position, and with each position having the seat rotated to a respective facing direction characterized as forward and rearward directions. Specific application of this seat is found in a tractor which has a working implement on the front and which has certain controls, requiring that the operator sit in the seat and face toward the front of the tractor. In that position, the seat is normally in its lowered and forward facing position. However, the tractor commonly has additional controls rearwardly of the seat, and these controls are for operating an implement attached to the rear of the tractor. Then, it is desired that the seat be raised and rotated to face the rear of the tractor, so that the operator will have better accessibility of the rear controls, as well as a better view of the operation of the implement at the rear of the tractor.

In this art, it is common to have a seat which can be raised and rotated, for the forward and rearward positions mentioned. However, seats known heretofore either require elaborate mounting means and lift means for adjusting them as described, or they have no lift means and the operator is required to manually lift the seat, which is frequently a seat heavy and bulky so that it cannot be easily manually raised.

Another problem with the prior art seats is that they must be held in the raised position, either by holding them manually or with the lifting apparatus, while they are being rotated and the locked or secured position of the seat is being sought through maneuvering of the seat assembly. This therefore requires certain manipulation of the seat assembly in order that the seat can be placed in either its raised or lowered, and then secured, position.

The present invention overcomes the aforementioned problems, and is accomplishes the desired results by having a seat structure which does not require that it be manually raised, or that it be raised by a complicated mechanism, in order to adjust the seat between two or more vertically adjusted positions. Also, the present invention provides the means for simply, accurately, and readily rotating the seat between a forwardly facing position and a rearwardly facing position, without requiring that the seat be carefully manipulated to secure it in the forward position and in the rearward position. Also, the present invention provides for securely retaining the seat in any adjusted position, even though the tractor or the like where the seat is installed is being subjected to vibration and bouncing as the tractor implements are being used or as the tractor is being driven over a bumpy road.

BRIEF DESCRIPTION OF THE DRAWING

FIG. 1 is a side elevational view of a tractor having a preferred embodiment of this invention incorporated thereon.

FIG. 2 is a side elevational view of the embodiment shown in FIG. 1, but showing it enlarged and from the side opposite FIG. 1 and only fragmentarily, rather than fully, shown.

FIG. 3 is a top plan view of a portion of FIG. 2.

FIG. 4 is a side elevational view of a portion of FIG. 2.

FIG. 5 is a side elevational view showing the seat raised and reversed from the position shown in FIG. 2.

DETAILED DESCRIPTION OF THE PREFERRED EMBODIMENT

FIG. 1 shows the seat structure, generally designated 10, to be mounted on a tractor 11 having a forwardly located bucket 12 and a rearwardly located backhoe 13. A tractor steering wheel 14 and ground wheels 16 and 17 are also included in the tractor which is supported for movement over the ground G. Forwardly located controls, such as the control 18, and reawardly located controls, such as the control 19, are also on the tractor.

Except for the seat structure 10, the tractor is of a conventional design having a forwardly mounted implement and a rearwardly mounted implement, as mentioned. The seat structure 10 is shown in the forwardly-faced position, and the operator occupying the seat would have accessibility to the steering wheel 14 and the control 18, as desired. When it is desired to operate the backhoe 13, then the operator desires to turn to a rearwardly facing position on the tractor and have the controls 19 directly in front of him. He also then desires to face the backhoe 13 and to be in a position where he can both control the backhoe through accessibility to the controls 19 and to see the backhoe in operation. Therefore, in the forwardly facing position shown, the seat is in a lowered position, and when the operator is using the backhoe 13, then the seat is in a raised position for accessibility to the controls 19 and a better view of the ground on which the backhoe 13 is operating.

It is also of a conventional arrangement to have the seat structure 10 include the seat portion 21, backrest portion 22 and the slanted track or guide 23. The track 23 permits the seat portions 21 and 22 to be slid along the diagonal line shown, so that the seat may be moved forwardly and rearwardly along the slanted track 23 to thereby lower and elevate the seat, as desired.

The seat 10 is therefore mounted on the tractor floor designated 24, and the seat 10 includes the seat post 26 which forms the seat assembly along with the slanted tract 23 and the seat portions 21 and 22.

The drawings also show a seat pedestal 27 which is of a tubular shape and which is affixed to the floor 24 by means of weldments W and gusset plates 28 affixed between the floor 24 and the pedestal 27. The pedestal 27 is therefore tubularly shaped and uprightly disposed, and it has upwardly faced shoulders or support surfaces 29 and 31 extending around respective halves of the upper end of the sleeve 27. Also, the sleeve 27 is longitudinally grooved or split by means of the groove 32 extending therein on both sides of the sleeve 27, as shown in FIGS. 2 and 4. This arrangement therefore presents the guide surfaces 33 and 34 extending at least approximately longitudinally of the pedestal or sleeve 27, as shown.

The seat assembly has its seat post 26 telescopically received in the sleeve 27, and the lower end 36 of the post 26 is shown extending below the sleeve 27 in FIGS. 2 and 4. A cam plate 37 is affixed by means of the weldment 38 to one diametrical side of the post 26 to project to that one side and transverse to the axis of the post 26. The lower surface 39 of the plate 37 is thus in overlying position with respect to the pedestal supporting surface or shoulder 29, in the full-line position in FIGS. 2 and 4. This therefore supports the seat assembly in the forwardly facing and lowered position, as the seat is shown in FIG. 1. Further, a pin 41 extends diametrically through the post 26 immediately below the plate 37, and the pin is available for engaging the surfaces 34 on diametrically opposite sides of the pedestal sleeve 27. This therefore retains the post 26 in the desired rotated position with respect to the sleeve 27, and it therefore retains the seat in the forwardly facing position desired.

Of course the upper end 42 of the post 26 is suitably affixed to the seat lower portion 21 and frame or slanted track portion 23, so that raising and lowering of the post 26 will similarly raise and lower the seat portions 21, 22 and its supporting structure 23.

To raise the seat assembly, a lift means is provided, and it consists of a lever 43 pivotally mounted on a pin 44 stationarily supported by plates 46 suitably affixed to the tractor floor 24. One end of the lever 43 has a pedal 47, and the other end of the lever 43 has a sphere 48 affixed thereto. The sphere 48 engages the bottom surface 39 of the plate 37, and is in sliding contact with the surface 39. Thus depressing the pedal 47 will cause the lever 43 to go into the dot-dash line position shown in FIG. 2, and this will likewise cause the plate 37 to rise to the dot-dash line position of FIG. 2. Therefore, the entire seat assembly is raised as the post 26 is slid upwardly with respect to the pedestal 27. The lever 43 is pivoted to where its end 49 abuts the floor 24, and it therefore provides a stop means for the lever or lift means described. At that point of limited pivot, the seat assembly is raised to its maximum extent, so the pin 41 is then above the shoulder or supporting surface 31, as well as is the plate 37, so the seat can then be rotated to the rearwardly facing position, with respect to the tractor. During this rotation, the lever 43 continues to support the weight of the seat assembly, so that the operator need not hold the seat assembly for the adjusting purpose of turning the seat assembly, as he only needs to retain foot pressure on the pedal 47.

A pin 51 is extending from the post 26 and below the pin 41, and to only one diametrical side of the post 26, as shown in FIGS. 3 and 4. Thus the pin 51 is available for engaging one of the two guide surfaces 34 on the pedestal 27 to prevent rotation of the seat assembly in a direction which would cause the semicircular plate 37 to fall off its supporting sphere 48. That is, in the arrangement shown in FIG. 2 and the positions therein, the seat assembly is shown in the forwardly facing position, and when it is raised to a position shown by the dot-dash position of the post projection or plate 37, the pin 41 is above the shoulder 31, while the pin 51 is not. Thus the seat assembly can be rotated only in the direction where the pin 51 will move away from the near surface 34 on the pedestal 27, and that would be in the clockwise direction of rotation of the seat assembly, when viewed from above. This direction of rotation also causes the cam plate 37 to remain in contact with the sphere 48. Then, when the foot pressure of the lever 43 is released, the cam plate 37 will rest upon the shoulder 31 to support the seat in the raised and rearwardly facing position. Also, the pin 41 will then be in a position to have its projecting ends adjacent the surfaces 34 on the pedestal 27, so the seat assembly will not rotate until it is again raised to the dot-dash line position of FIG. 2 and is manually rotated in the reverse of the order described.

The pin 51 therefore provides rotation guide means, a pin 41 provides rotation lock means in both the lowered and raised positions of the seat assembly. Also, the operator need not manipulate the seat assembly for placing it in its desired raised, lowered, or turned positions, since the pins provide the guides and alignments. In this context, the plate 37 and the pin 41 are holding means on the seat assembly for retaining the latter in the desired raised or lowered positions, and in the desired rotated positions, on the pedestal 27.

What is claimed is:

1. A vertically and rotationally adjustable seat structure, including a tubularly shaped support pedestal, a seat assembly including a seat bottom and seat back arranged to support a person in a first direction of a forwardly facing position and including a post, said seat post being telescoped in said support pedestal and being rotatable and vertically movable relative to said pedestal for rotational adjustment and vertical adjustment of said seat assembly with respect to said pedestal, holding means on said seat post and being interengaged with said pedestal for retaining said seat assembly in adjusted rotated and vertical positions with respect to said pedestal, lift means operative on said seat assembly for raising the latter relative to said pedestal, the improvement comprising said lift means being of the manually operable type to provide a mechanical advantage in overcoming the weight of said seat assembly in the vertical adjustment thereof, said pedestal including two vertically spaced apart support shoulders on diametrically opposite sides of said pedestal and extending on planes transverse to the tubular axis of said pedestal for upwardly engaging said holding means in two vertically adjusted positions of said seat assembly, and said holding means including rotation locking means inter-connected between said seat post and said pedestal in both of said vertically adjusted positions of said seat assembly and being disposed for retaining the latter faced in either said first direction or faced in the direction opposite from said first direction, said holding means of said seat post including a support portion extending both transverse to the axis of said seat post and around only one side thereof for alternately resting on said shoulders in upwardly supporting said seat assembly on said pedestal.

2. The subject matter of claim 1, including stop means effective on said lift means to limit the height to which said seat assembly can be raised, and a pin projecting outwardly from said seat post for engagement with said pedestal in response to rotation of said seat post in said pedestal to restrict the rotation of said seat post so that said support portion is mutually exclusively disposed to overlie respective ones of said shoulders in respective rotated positions of said seat post.

3. The subject matter of claim 2, wherein said lift means is a foot-operated lever having one end pivotal into contact with said stop means which is an abutment limiting the pivot of said lever, and with said pedestal being longitudinally stepped to provide abutments for said pin in the engagement of said pin with said pedestal in response to the rotation of said seat post in said pedestal, and said pin projecting from said seat post on only one diametrical side of said seat post so that the latter can rotate in said pedestal up to, and no more than, a portion of one full circle.

4. The subject matter of claim 1, wherein said pedestal is uprightly disposed and is longitudinally slotted between said shoulders, and said seat post includes two pins projecting therefrom in spaced-apart positions axially along said seat post and on diametrically opposite sides thereof and below said support portion, the lower one of said pins projecting on only one diametrical side of said seat post for rotation of the latter in said pedestal up to, and no more than, a portion of one full circle.

5. The subject matter of claim 1, including rotation guide means operatively connected between said seat post and said pedestal for restricting rotation of said seat post on said pedestal to alternately align said support portion directly above said shoulders.

References Cited

UNITED STATES PATENTS

| | | | |
|---|---|---|---|
| 208,000 | 9/1878 | Tripp | 297—347 |
| 405,600 | 6/1889 | Richardson | 297—349 |
| 671,395 | 4/1901 | Hayward | 248—407 |
| 1,684,306 | 9/1928 | Brooks | 248—418 |
| 2,044,675 | 6/1936 | Erwin | 297—240 |
| 2,242,138 | 5/1941 | Muma | 297—349 |
| 2,604,925 | 7/1952 | Swift | 297—349 |
| 2,763,320 | 9/1956 | Schram | 248—415 |
| 3,304,121 | 2/1967 | Vincens | 297—349 |
| 3,437,373 | 4/1969 | Boston | 297—349 X |

FOREIGN PATENTS 503,969   4/1939   Great Britain.

FRANCIS K. ZUGEL, Primary Examiner

U.S. Cl. X.R.

248—404, 418; 297—349